United States Patent [19]

Smith

[11] Patent Number: 5,146,127
[45] Date of Patent: Sep. 8, 1992

[54] WINDINGLESS ROTOR, FIELD EXCITED, VARIABLE RELUCTANCE, SYNCHRONOUS-TYPE MACHINES

[76] Inventor: Larry L. Smith, 1015 Smith Road, Xenia, Ohio 45385

[21] Appl. No.: 623,231

[22] Filed: Dec. 6, 1990

Related U.S. Application Data

[63] Continuation-in-part of Ser. No. 390,381, Aug. 7, 1989, abandoned, which is a continuation-in-part of Ser. No. 256,996, Oct. 13, 1988, abandoned, which is a continuation-in-part of Ser. No. 32,542, Apr. 1, 1987, abandoned.

[51] Int. Cl.$^5$ .............................................. H02K 1/08
[52] U.S. Cl. .................................................. 310/166
[58] Field of Search ............... 310/179, 180, 186, 187, 310/190, 191, 269

[56] References Cited

U.S. PATENT DOCUMENTS

| | | | |
|---|---|---|---|
| 505,783 | 9/1893 | Ashley | 310/269 |
| 505,926 | 10/1893 | Schmid | 310/269 |
| 1,773,074 | 8/1930 | Borreson | 310/168 |
| 3,081,412 | 3/1963 | Granier | 310/254 |
| 3,257,572 | 6/1966 | Ludemann et al. | 310/190 |

FOREIGN PATENT DOCUMENTS 761180  2/1954  Fed. Rep. of Germany ...... 310/187

*Primary Examiner*—Steven L. Stephan
*Assistant Examiner*—D. L. Rebsch

[57] ABSTRACT

Windingless rotor, variable reluctance, field excited, eletromechanical machines that provide for a family of windingless rotor machines consisting of both line commutated, synchronous machines, and self-commutated or self-synchronous machines, in both rotary and linear format. The basic operational format of this group of machines is a combination of an interdependent working relationship between the geometric parameters of the stator and rotor poles, and specially contoured pole surfaces and tips, all working in a complementary relationship to provide magnetically workable, variable reluctance air gaps that are capable of controlling the alternating magnetic flux waveform to effect a viable and efficient energy conversion process at substantially the fundamental frequency component, which is also the synchronous frequency of operation of the machine.

18 Claims, 12 Drawing Sheets

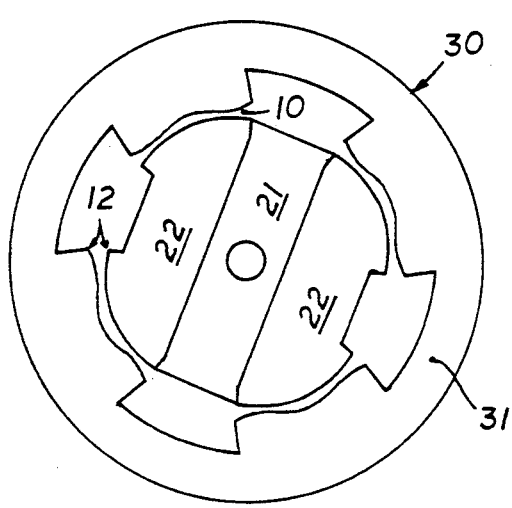
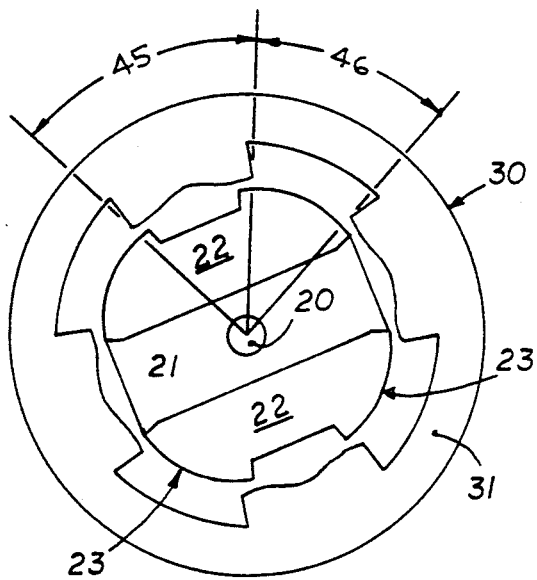
FIG. 17　　　　　　FIG. 18
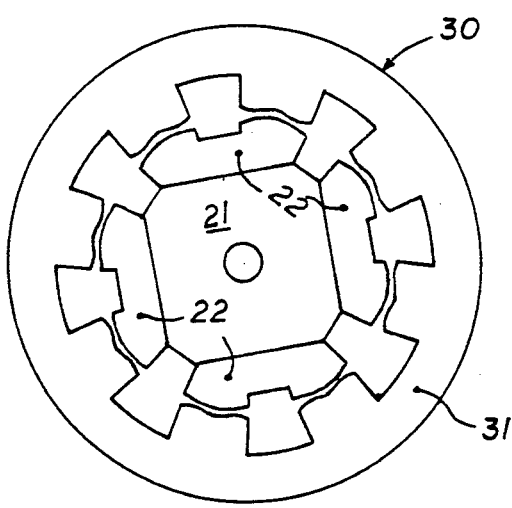
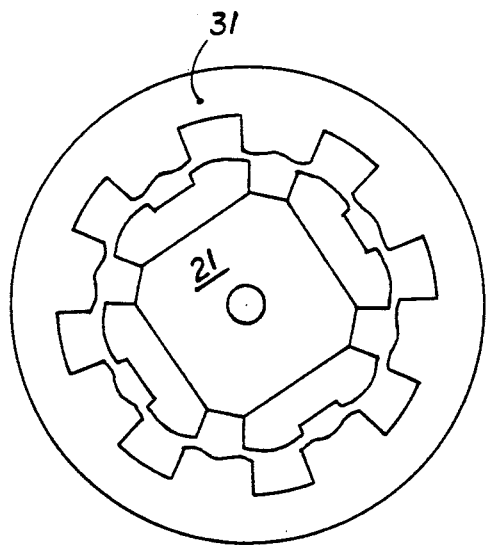
FIG. 19　　　　　　FIG. 20

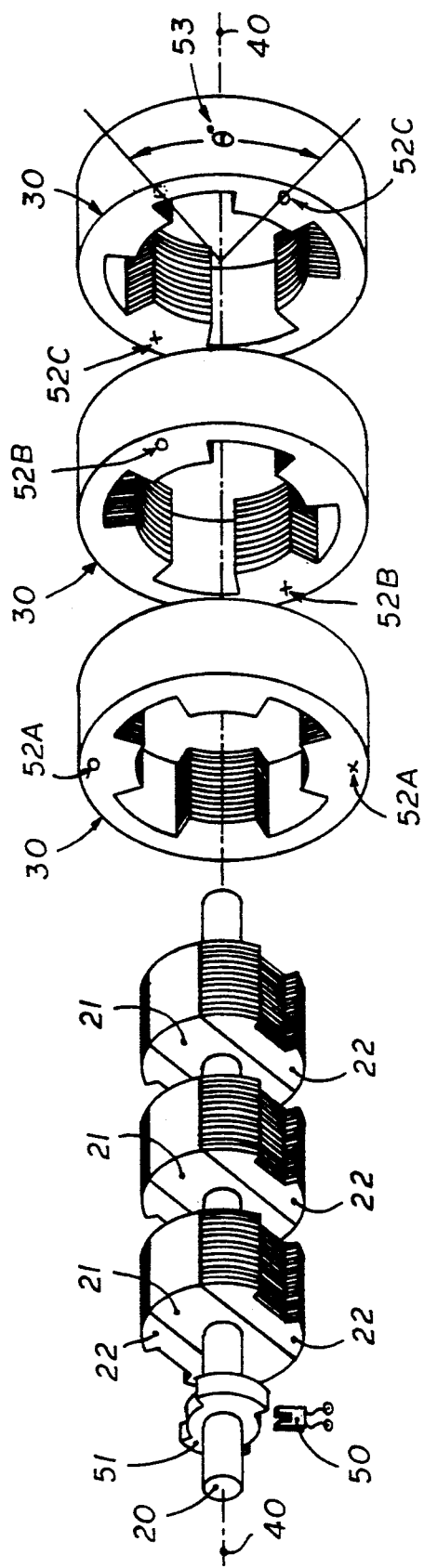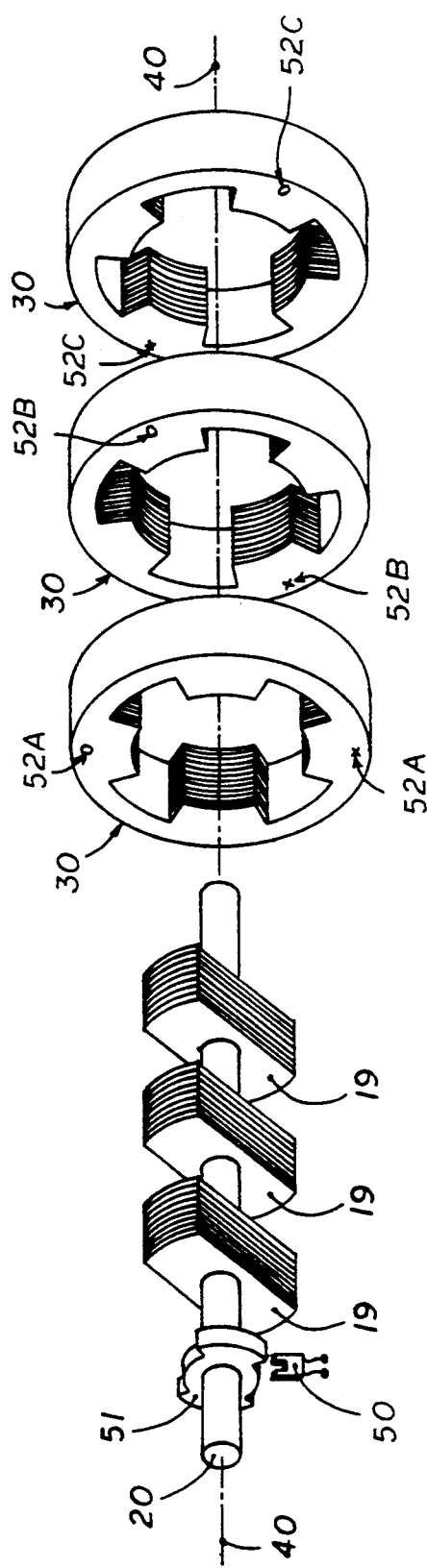

WINDINGLESS ROTOR, FIELD EXCITED, VARIABLE RELUCTANCE, SYNCHRONOUS-TYPE MACHINES

BACKGROUND OF THE INVENTION

This application is a CONTINUATION-IN-PART application which discloses and claims additional subject matter, supplementing subject matter disclosed in the copending application with the U.S. patent office Ser. No. 390,381 and a Filing Date of Aug. 7, 1989, and the parent CONTINUATION-IN-PART application with the U.S. patent office Ser. No. 256,996 and a Filing Date of Oct. 13, 1988, and the original parent application with the U.S. patent office Ser. No. 032,542 and a Filing Date of Apr. 01, 1987 all now abandoned.

1. Field of the Invention

This invention relates in general to the field of art of the windingless rotor, separately or field excited (herein referred to as field excited), electromechanical machine, and more specifically to the art of the variable reluctance, synchronous machines and the generically related species which involve, and are dependent on, the basic concepts of this invention.

2. Background Information and Prior Art

With reference to the prior art, field excited, electromechanical machines can be adequately represented by the general categories of (a) conventional machines, and (b) specialty machines.

Conventional, field excited, electromechanical machines can be classified into the two general sub-categories of (1) line-commutated synchronous machines, and (2) self-commutated, or direct-current machines. These machines provide for an energy and power conversion process in the form of electrical energy and power to mechanical energy and power, and vise versa, by the interaction of an alternating magnetic field produced by an armature winding, and a magnetic field produced by a direct current in a field winding, or a constant magnetic source, such as a permanent magnet. Conventional machines being used in industry are structured such that the armature windings are on the stator, and the field windings (or permanent magnets) are on the rotor, or vise versa.

The line-commutated, field excited, synchronous machine is typically constructed with the armature windings on the stator and the field windings mounted on the rotor structure. In the case of field windings—slip rings, brushes and commutator surface, or an induction exciter/rotor mounted diodes are typically used to energize the field windings.

The conventional, self-commutated machine operates on a slightly different principle from the above synchronous machine, but is categorized and included here because of the method of excitation and structure. Similar to the line-commutated, synchronous machine mentioned above, it also has a separately excited field and has the conventional construction of armature windings on the rotor, and field windings or permanent magnets on the stator, thereby requiring a means to transfer electrical energy to the armature windings on the rotor.

In both of the above stated categories, the machines involved have common factors which impose significant design, application, and/or operational considerations and limitations. These factors are related to the structural integrity of the rotor windings, and also, to the maintenance, reliability, and economics of the devices required to transfer electrical energy to the rotor windings, such as slip rings, brushes and commutator surfaces, or induction exciter with rotating diode systems. In the case of machines using permanent magnets on the rotor, design and application considerations and limitations are relative to (1) the tensile strength of the permanent magnets, (2) the lower flux densities of permanent magnets, and thus the economics of lower power-to-weight ratios, and (3) the lack of ability to control output by adjustment of the source of the separate field excitation. In addition, large frame, self-commutated machines require the addition of commutation interpoles to improve upon the commutation process and to increase the overall efficiency of the machine. Interpole structures are a significant part of large self-commutated machines, and accordingly, add to the weight and cost of the machine.

In another sub-category of the field excited, electromechanical machine, the art deals with windingless rotor construction. Numerous types of windingless rotor, specialty machines are known, but only the few which are relevant will be elaborated on herein, in order that the pertinent distinguishing features can be addressed. Specific reference will be made to U.S. Pat. No. 525,353 (McElroy), U.S. Pat. No. 1,773,074 (Borreson), U.S. Pat. No. 2,814,745 (Sinclair), and U.S. Pat. No. 3,223,866 (Tiltins), to highlight the state of the art and the distinguishing features which have been conceived and disclosed, as efforts to advance the art of windingless rotor, field excited, electromechanical machines.

McElroy discloses a machine which has alternate armature poles and field poles uniformly positioned radially on the stator. The rotor is made up of uniformly spaced, magnetically isolated soft iron armatures which magnetically close the magnetic circuit made up of a stator armature pole and a stator field pole. The combination of the stator structure and the rotor structure provides for the functional entity of a machine which allows for an energy conversion process from mechanical energy to electrical energy by alternately linking an armature winding with a field pole of one polarity, and then with a field pole of the opposite polarity, as the magnetically passive bridging elements rotate with the rotor assembly. As such, the machine uses the induction principle to induce an electromotive force into the armature coil. This electromotive force has a waveform that is dependent on the time rate of change of the varying magnetic flux. The varying magnetic flux is a result of the varying magnetic circuit reluctance, and accordingly, being a function of the magnetic pole separation distance. This constant-area/variable-distance method of varying the magnetic circuit reluctance necessitates a high ratio of stator pole separation distance to pole width, which has a significant disadvantage in producing an output waveform having a relatively low fundamental component content.

Borreson discloses a machine which has alternate armature poles and field poles uniformly positioned with a radial orientation on the stator. The rotor is made up of uniformly spaced, magnetically isolated arcuate-shaped plates which magnetically bridge one stator armature pole with one stator field pole. The combination of the stator structure and the rotor structure provides for the functional entity of a machine which allows for an energy conversion process from mechanical energy to electrical energy by rotating the arcuate-shaped plates such that a field or force will be constantly cut, thereby generating an induced current. As with McElroy, the principle of operation is to induce an electromotive force in the armature coil by varying the magnetic flux linked with the coil. However, unlike McElroy, Borreson uses a technique of varying the area of the working air gap between the stator and rotor pole while maintaining the separation distance (or the effective air gap) essentially constant, to vary the magnetic circuit reluctance, and thus the magnitude of the magnetic flux.

The distinguishing difference, and improvement of Borreson over McElroy, was the increase in the ratio of the pole-width to pole-separation distance. This affected (increased) the magnetic linkage between the field winding and the armature winding, in an apparent effort to improve the energy and power output of the machine's conversion process by increasing the relative content of the fundamental component of the output waveform. However, the inherent nature of both methods of flux modulation results in an output emf waveform that abounds with higher-order harmonics; especially with a minimal (and efficient), direct-axis air gap.

Other contributions to the art of windingless rotor, field excited machines can also be cited, with the variable reluctance machine of Sinclair being a notable example. However, unlike McElroy and Borreson, Sinclair has a rotor embodiment which is constructed of continuous, magnetic material. But here again, the disclosure (of Sinclair) does not significantly advance the capability and utility of the variable reluctance, field excited machine—by failing to provide a resolve for the shaping (or control) of the output emf Waveform.

As representative of one of the most common and recent contributions to the art of windingless rotor machines, Tiltins discloses a machine which has a stator structure whereby uniformly spaced armature windings are located about the inner stator surface, and field windings are positioned in a traverse orientation. A rotor assembly is magnetized and polarized through air gaps, by the traverse field windings on the stator. Each (axial) end of the rotor thus forms a magnetic pole, and therefrom protrude, in an alternate pattern, the magnetically active rotor poles of the rotor assembly. Also, a complete magnetic circuit consists of four air gaps. Since the machine disclosed by Tiltins has a constructive format which utilizes flux paths in both a longitudinal and a traverse direction, and also, magnetically active rotor poles, it does not share the same advantages of a machine with radial, uniplanar magnetic circuits, consisting of only two air gaps. This machine does not have the characteristic low reluctance, two air gap, magnetic circuits typical of a uniplanar format, which are common for machines used in conventional commercial energy and power conversion applications. The axial length of this machine is significantly limited by the diameter of the rotor and the associated limiting cross sectional area of the rotor in carrying the traverse magnetic flux.

In assessing the advances in the state of the art, as represented by the above machines, a special note is made of the following points, as referenced to the improvements and innovations disclosed by the present invention.

Neither the disclosure of McElroy, Borreson, nor Sinclair has advanced the art of variable reluctance, field excited, synchronous machines to a quality of performance characteristic of the conventional synchronous generator and motor.

Also, those skilled in the art, and prior invention have failed to recognize and develop the essential combination of elements and the cooperative interdependent working relationship required for a windingless rotor, variable reluctance, field excited, self-commutated synchronous-type machine.

In addition, none of the prior inventions cited, nor those skilled in the art have recognized and developed/provided for the complex resolve involving the pole surface and tip geometry, and an interdependent, complementary working relationship between the pole surface and tip geometry and the pole width, whereby providing for a geometrically dynamic, magnetically workable air gap that is the integral product of both a position-variable, average air gap magnitude, and the position-variable air gap area, and which is capable of an effective and efficient energy conversion process, while operating with a minimal air gap, at predominately or substantially the fundamental frequency.

Furthermore, none of the prior inventions cited, nor those skilled in the art have recognized and developed/provided the necessary interdependent relationships and mechanics of controlling the magnetic flux waveform necessary for line-commutated and self-commutated machines and their efficient operation.

SUMMARY OF THE INVENTION

Accordingly, it is the general object of this invention to provide for a new group of viable electromechanical, variable reluctance, field excited synchronous and synchronous-type machines, as a result of significantly improved performance, operation, and thus utility and value over the prior art forms, by the significant and unique improvements in the structural geometries and structural formats, over the prior art forms, as well as making possible new combinations or embodiments having additional utility and value.

One principle object of this invention is to provide a resolve for the proper and viable control of the air gap reluctance and thus the magnetic flux (waveform), to complement the fundamental component, as the poles move from the direct-axis position, on both line-commutated and self-commutated machines.

Another principle object of the present invention is to provide a resolve for the proper and viable control of the air gap reluctance and thus the magnetic flux (waveform), to complement the fundamental component, as the poles pass through the flux reversal (or the quadrature-axis position) zone, on both line-commutated and self-commutated machines.

Still another principle object of the present invention is to provide a resolve whereby the magnetic flux waveform can be provided for while maintaining an efficient and viable minimal direct-axis air gap reluctance.

It is still another principle object of this invention to provide for windingless rotor, field excited, variable reluctance machines which can produce an output, open terminal, electromotive force waveform that consists substantially of the fundamental component.

Another object of the present invention is to provide a resolve for the proper and viable control of the air gap reluctance and thus the magnetic flux (waveform), to complement a predetermined flux waveform, as the poles pass through the flux reversal (or through the quadrature-axis position) zone, on both line-commutated and self-commutated machines.

Another principle object of this invention is to provide the essential and unique combinations of elements and interdependent working relationships consisting of a resolve for special, interdependent and complementary, contouring of the magnetic pole surface and tips, in cooperation with interdependent working relationships with the magnetic pole width, to provide for a geometrically dynamic, variable reluctance air gap that is the integral product of both a position-variable magnitude of an average, or effective air gap and the position-variable air gap effective working area (or width), and which is capable of an efficient energy conversion process at predominately or substantially the fundamental frequency.

It is also an object of this invention to provide significantly improved embodiments over the prior art forms, as well as innovatively new embodiments, in the form of (commercially viable) windingless rotor, field excited, single-phase synchronous machines.

Another object of the present invention is to provide significantly improved embodiments over the prior art forms, as well as innovatively new embodiments, in the form of windingless rotor, field excited, polyphase synchronous machines as generic species of the machines herein represented.

Still another object of this invention is to provide significantly improved embodiments over the prior art forms, as well as innovatively new embodiments, in the form of windingless rotor, field excited, self-commutated machines, as generic species of the machines herein represented.

Another object of the present invention is to provide innovative embodiments of the machines herein represented, in linear formats.

BRIEF DESCRIPTION OF THE DRAWINGS

FIG. 17 thru 20 illustrate the machines in FIG. 13 thru FIG. 16 with the unique double-apex/single-apex contouring typical for synchronous machine operation.

FIG. 21 and FIG. 22 illustrate the element of angular rotational displacement between groupings of stator poles, relative to the rotor embodiment, and the element of rotor position indication or sensing (device). These elements are shown in context to the two types of variable reluctance machines of FIG. 5 and FIG. 13.

DESCRIPTION OF THE PREFERRED EMBODIMENT

Figure 1:
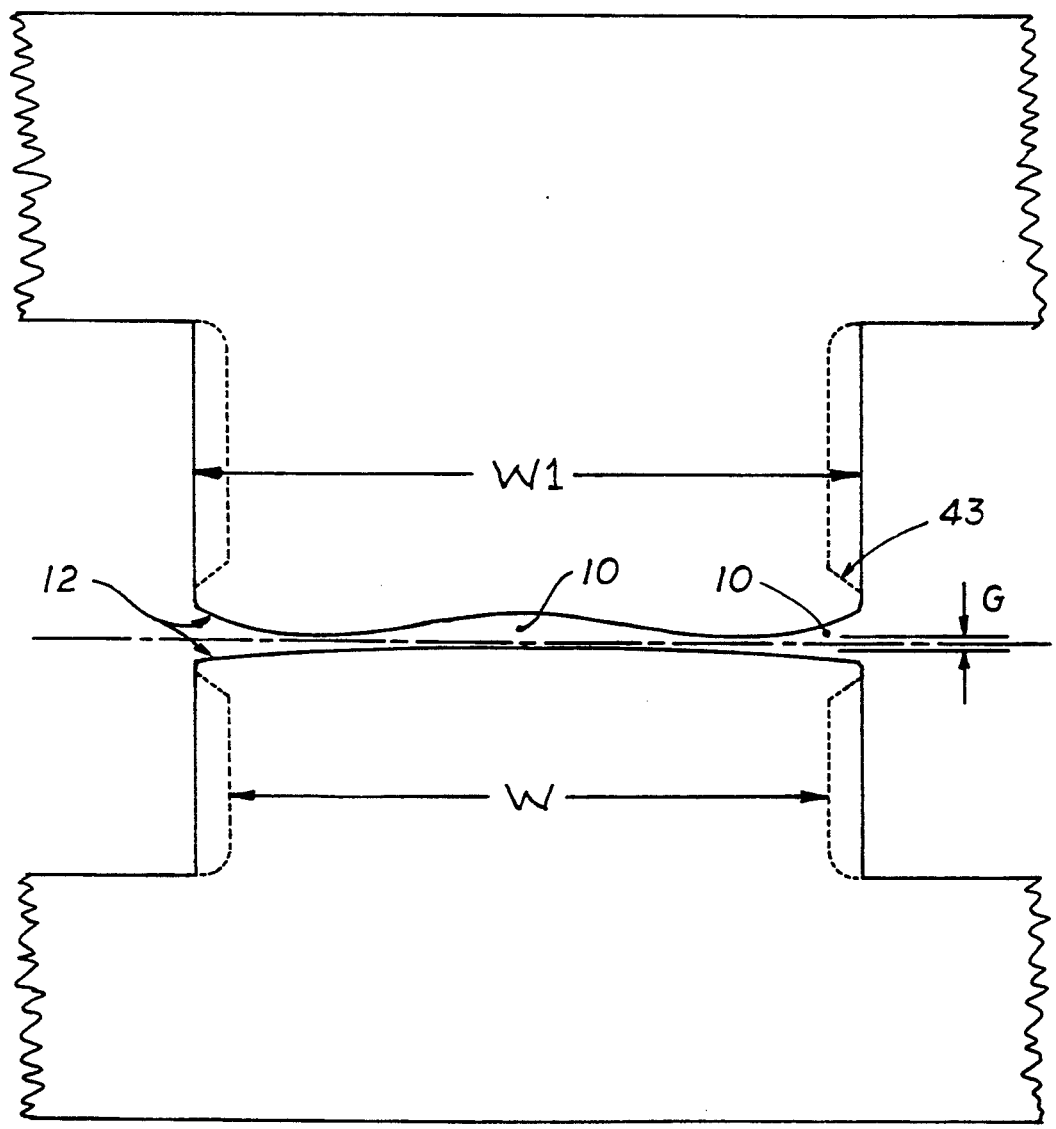
FIG. 1 consists of a set of salient poles which illustrates the unique nature of the special complementary contouring of the double-apex/single-apex concept.

For the purpose of promoting an understanding of this invention, reference will now be made to the preferred embodiment illustrated in the drawings, and specific language will be used to describe the physical makeup and the principle of operation of one of the several possible embodiments and/or combination of features, as an operational example of the present invention. It should be understood that no limitation of the scope of this invention is thereby intended, by this operational example, with any alterations or modifications in the illustrated embodiment and any application of the principles, features, and methods or processes within the spirit of the present invention and as illustrated therein being contemplated as would normally occur to one skilled in the art to which this invention relates.

Figure 2:
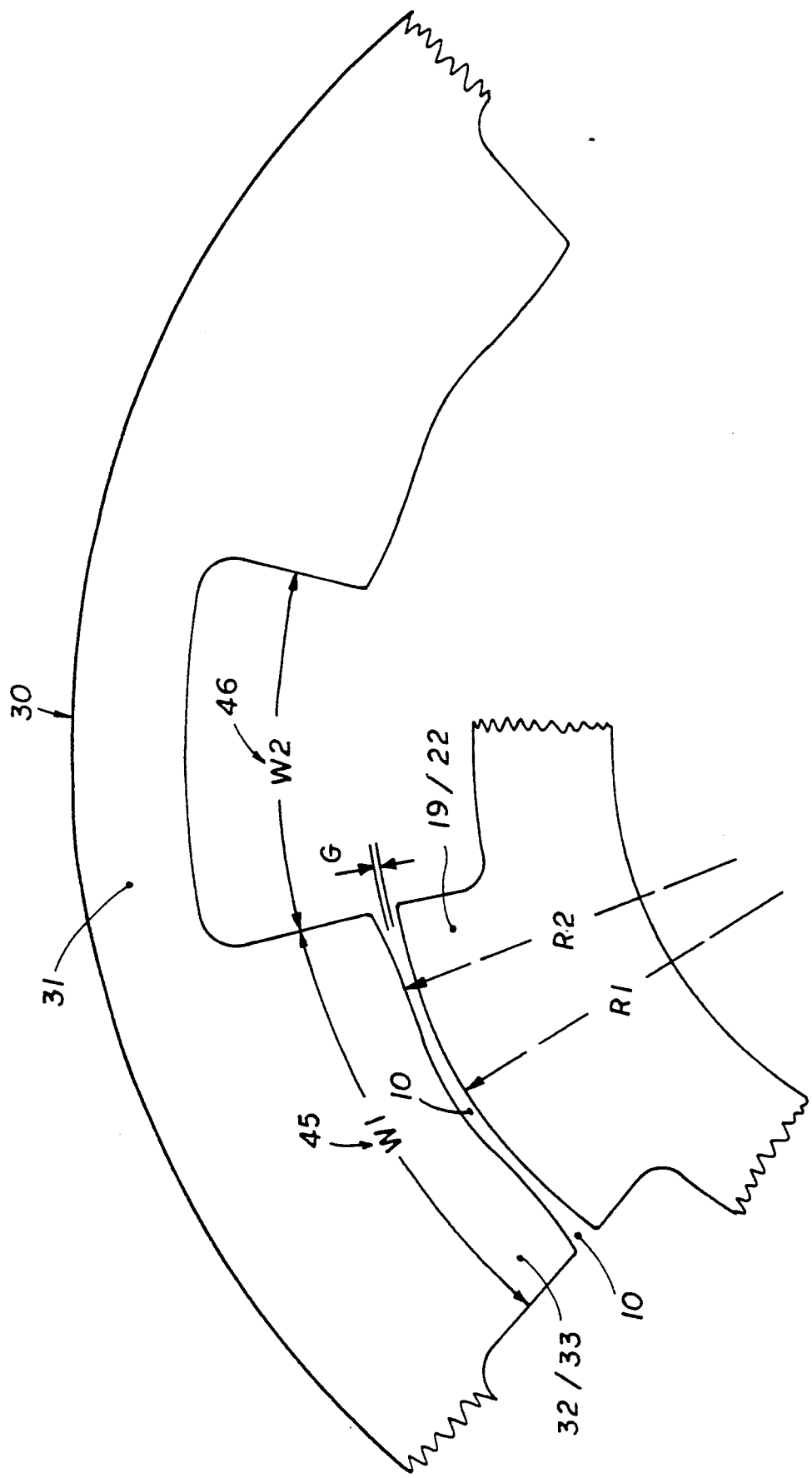
FIG. 2 illustrates a segment of a stator embodiment which highlights the increase in the pole width which is essential to complement the special contouring of the double-apex/single-apex concept.
Figure 3:
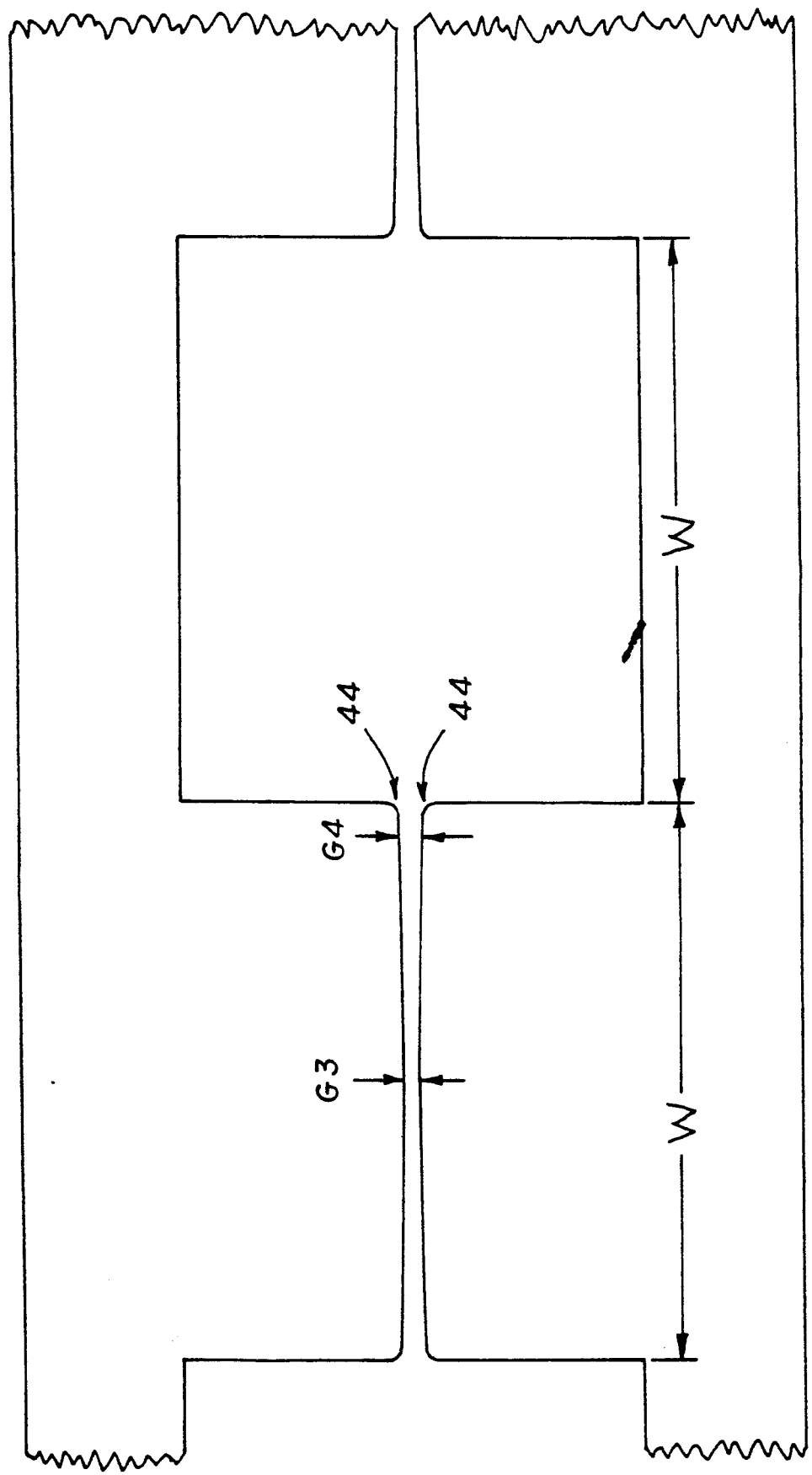
FIG. 3 illustrates a set of salient poles, highlighting the variable parameters which work in cooperation, to accommodate a substantially linear transition through the flux reversal zone, on linear commutated and self-commutated machines.
Figure 4A:
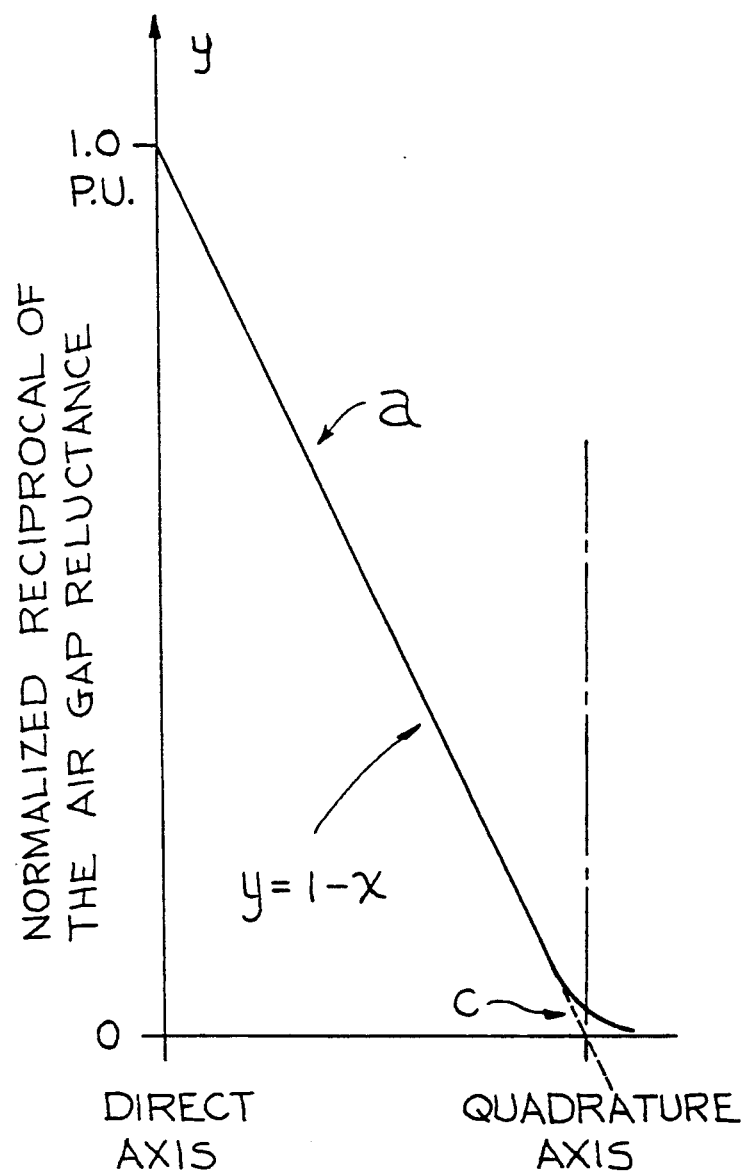
FIG. 4 illustrates the nature of the normalized armature magnetic flux (or the normalized reciprocal of the air gap reluctance) as the poles move from the direct-axis orientation toward the quadrature-axis position for (a) both linear commutated and self-commutated machines, and (b) synchronous machines with the double-apex/single-apex contouring. Also, illustrated in (c) is graphical detail of the composite concept for the complementary transition of the magnetic flux in the flux reversal or quadrature-axis zone.
Figure 4B:
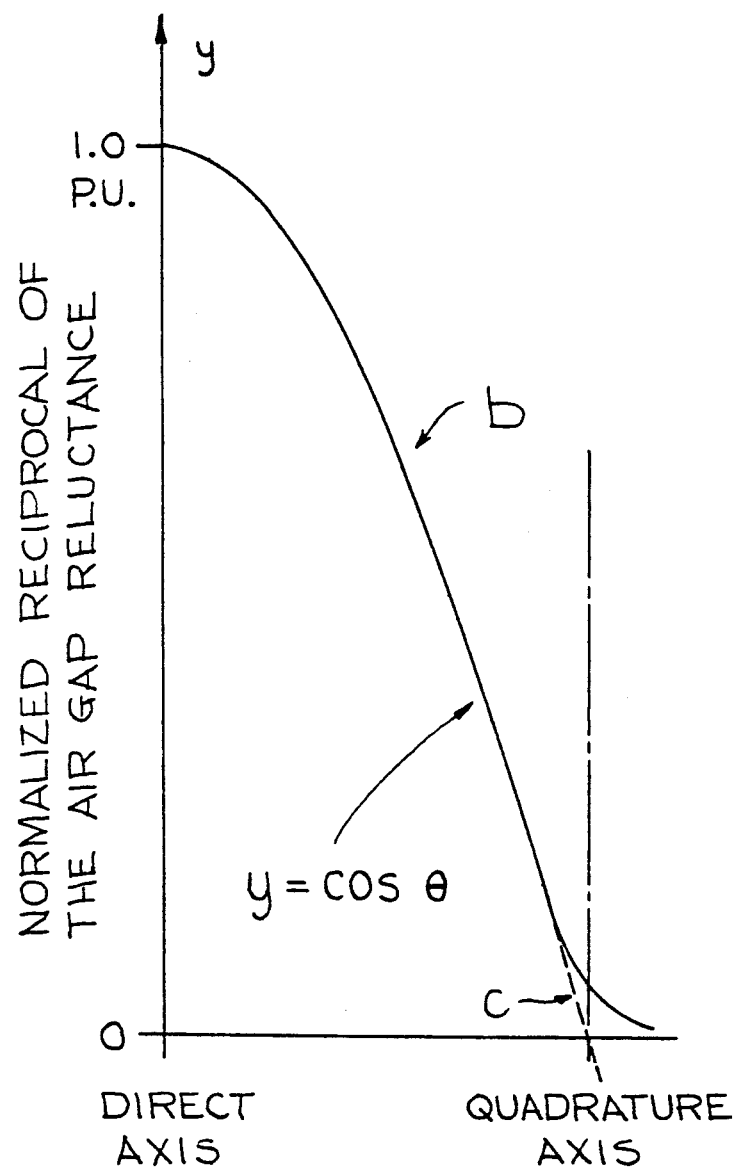
Figure 4C:
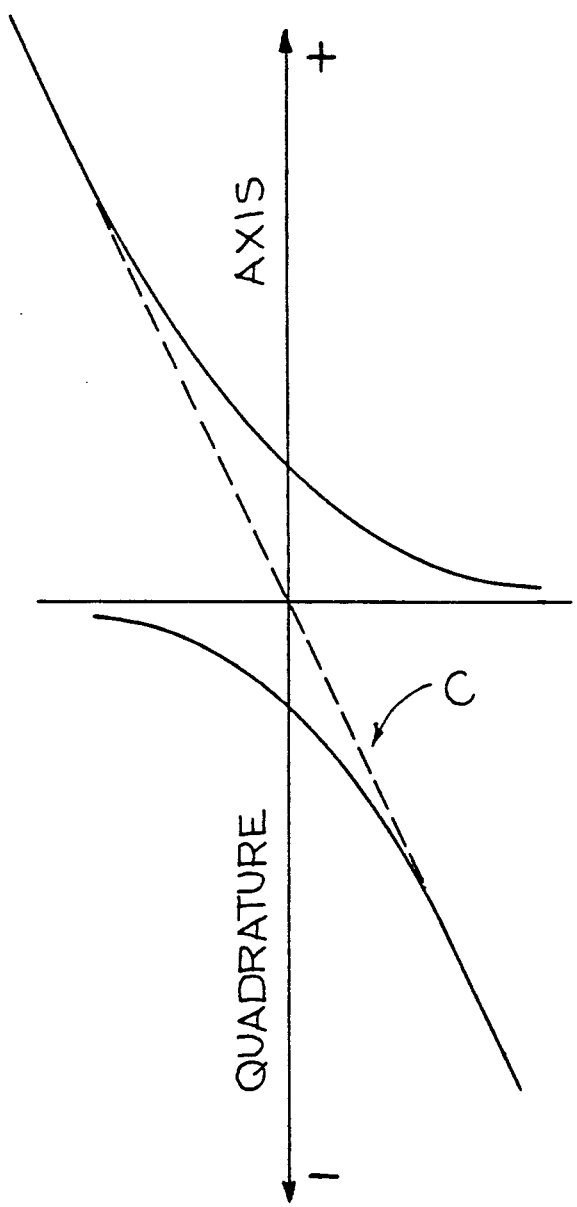
Figure 5:
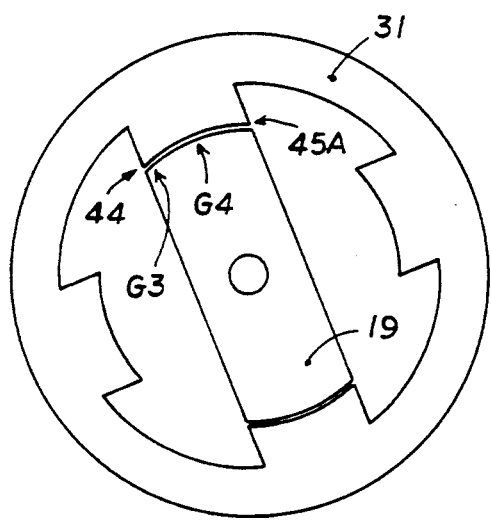
FIG. 5 illustrates the structural format of a 4-pole machine having a magnetically continuous (or solid) rotor structure, and shown in the direct-axis position.
Figure 6:
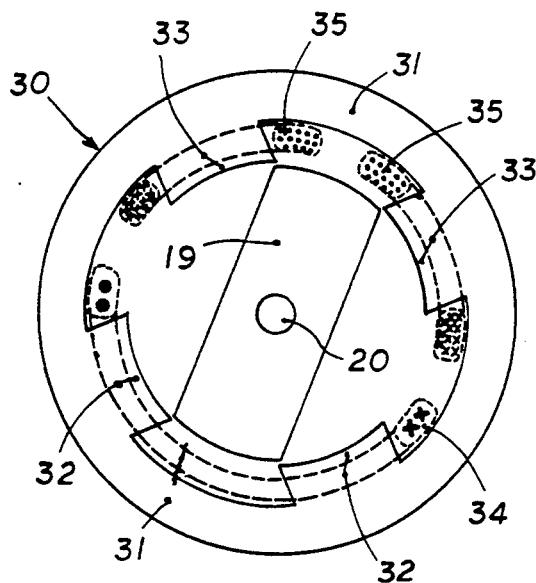
FIG. 6 illustrates the 4-pole machine of FIG. 5, but in a quadrature-axis orientation to highlight the substantially equal pole width and pole separation distance for the self-commutated or linear commutated embodiment shown. Also illustrated are the locations and polarity of the armature and field windings.
Figure 7:
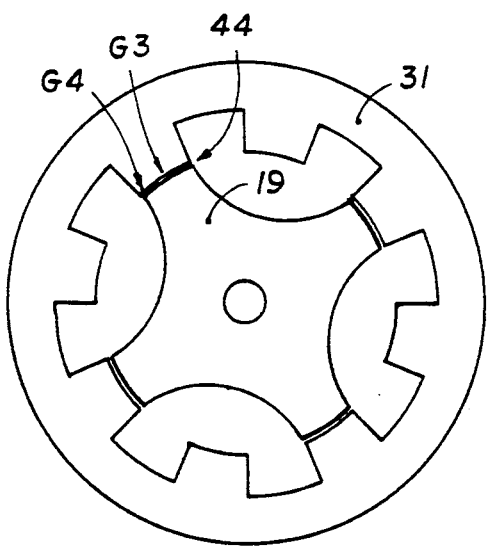
FIG. 7 is a machine similar to that in FIG. 5, but in a 8-pole format.
Figure 8:
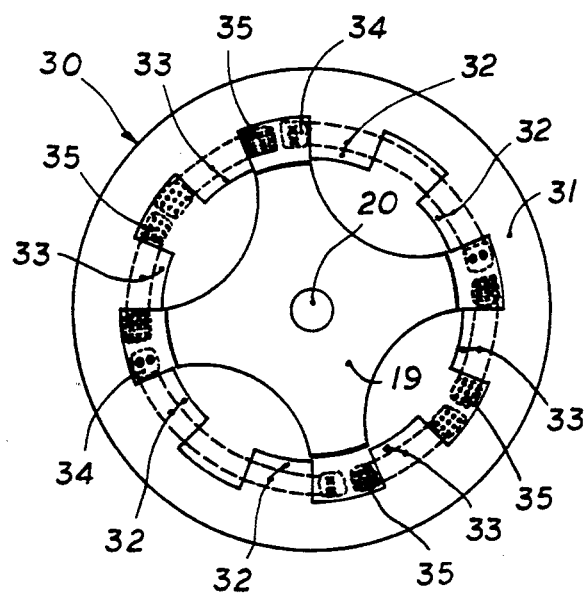
FIG. 8 is the machine of FIG. 7, but in the quadrature-axis position, and with winding locations and polarities indicated.
Figure 9:
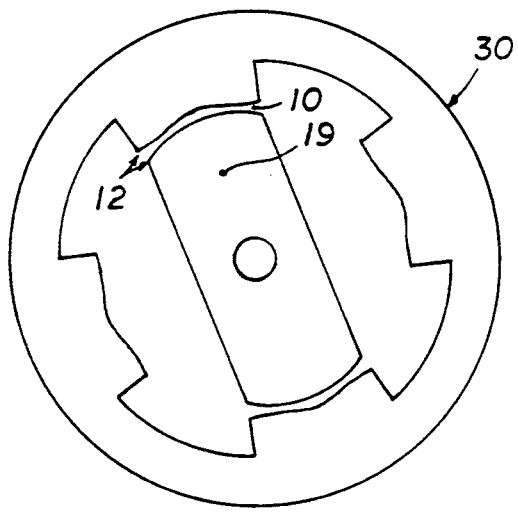
FIG. 9 and FIG. 10 illustrate the format of a 4-pole (solid rotor) machine in direct-axis and quadrature-axis orientation, respectively. Further detail illustrates the increased pole width which is required to complement the unique double-apex/single-apex contouring of the synchronous machine.
Figure 10:
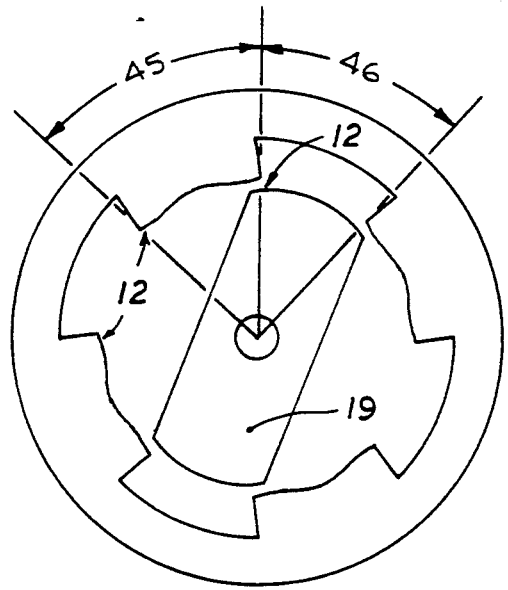
Figure 11:
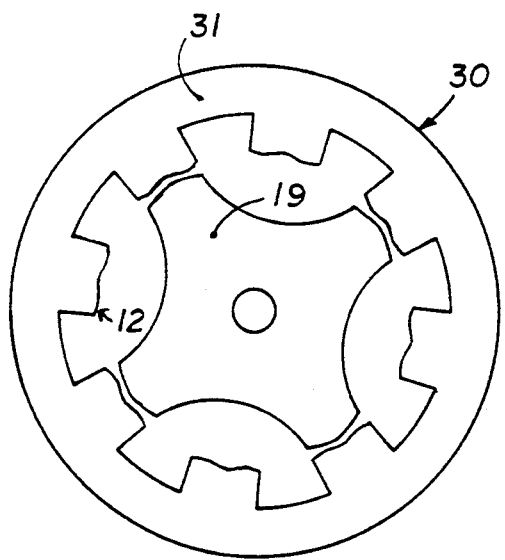
FIG. 11 and FIG. 12 illustrate an 8-pole (solid rotor), variable reluctance, field excited machine in both direct-axis and quadrature-axis orientation, respectively. Further detailed illustration shows the necessary increase in pole width which complements the unique double-apex/single-apex contouring of the synchronous machine.
Figure 12:
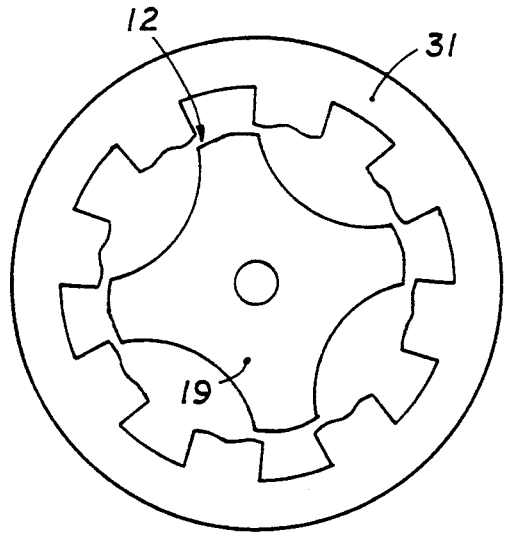
Figure 13:
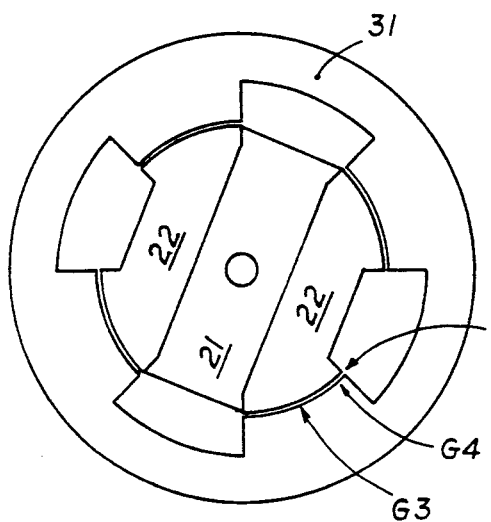
FIG. 13 and FIG. 14 illustrate the format of a 4-pole, variable reluctance, field excited machine, having a rotor embodiment that is not constructed with a continuous magnetic material.
Figure 14:
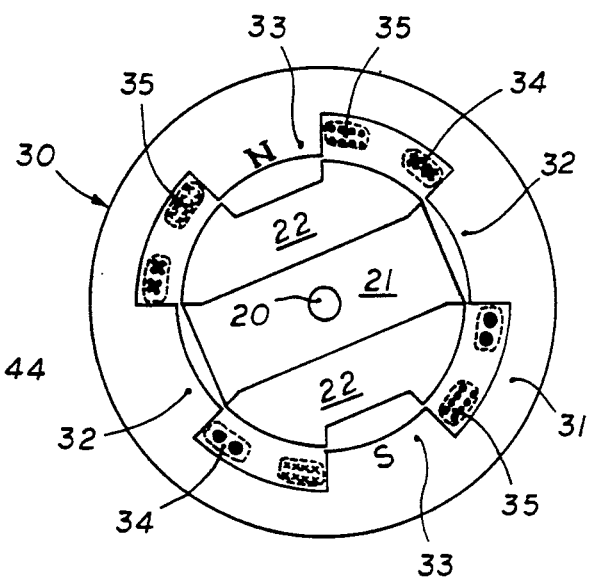
Figure 15:
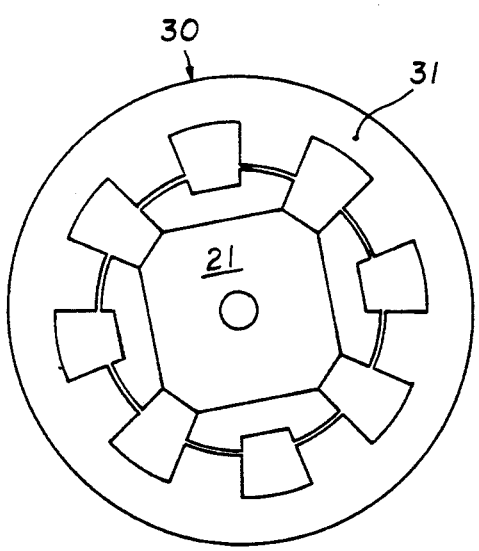
FIG. 15 and FIG. 16 illustrate the machine-in-principle of FIG. 13, but in an 8-pole format.
Figure 16:
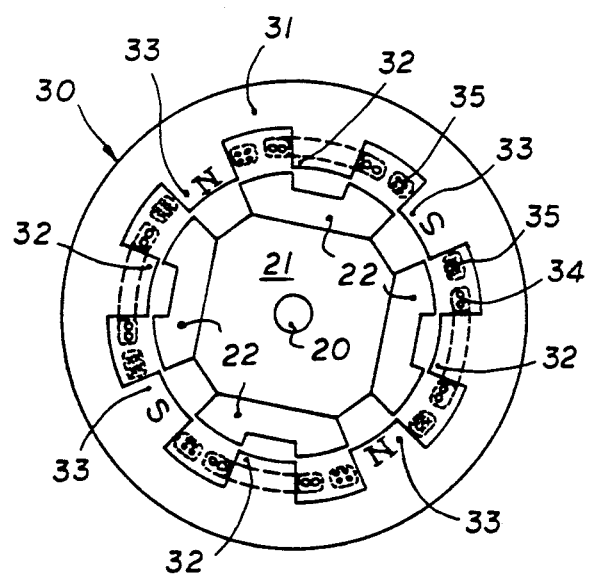
Figure 23:
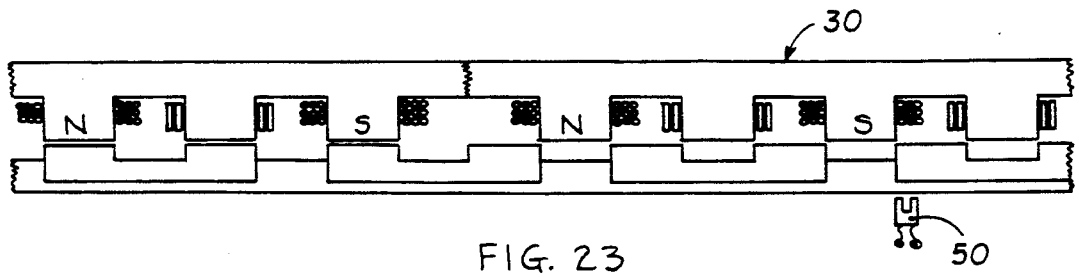
FIG. 23 illustrates the element of angular rotational (or electrical) displacement, in accordance with common vectorial principals, in one example of an embodiment having a linear format. Also, illustrated is the additional possible element of the position indication means/device.
Figure 24:
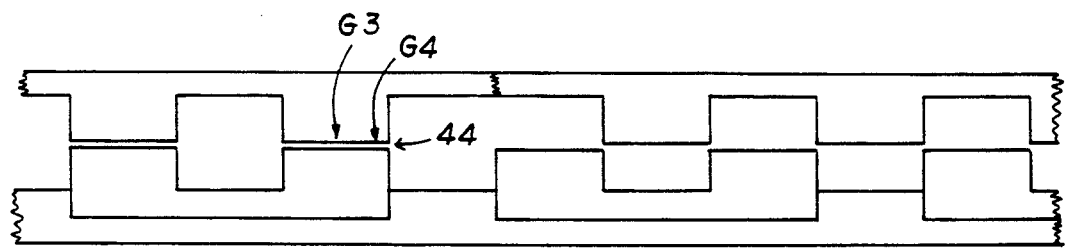
FIG. 24, FIG. 25, and FIG. 26 illustrate the various possible types of pole surface and tip contouring and the associated complementary adjustments in the pole working width.
Figure 25:
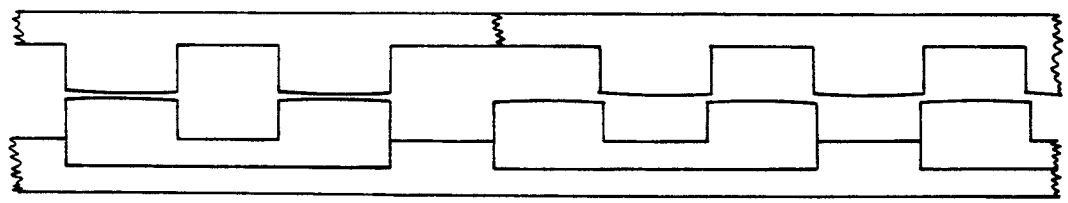
Figure 26:
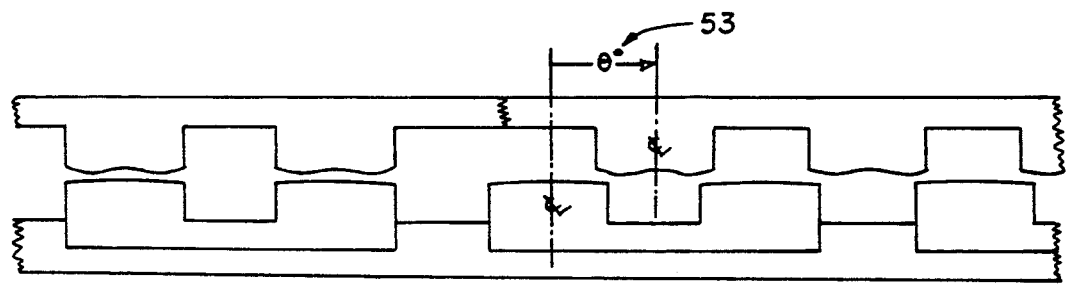

Accordingly, with reference to FIG. 14 and FIG. 18, there is illustrated one example of a windingless rotor, variable reluctance, field excited synchronous machine represented by the four-pole, single-phase stator assembly 30 and a corresponding four-pole rotor device 21 on rotor shaft 20. The stator assembly is typically constructed of common quality laminated magnetic material. The stator poles 32 and 33 are equally spaced around the stator device 30. The stator assembly and stator poles accommodate both the armature windings 34 and the field windings 35 (or permanent magnets), as illustrated in place in FIG. 14, on stator armature poles 32 and stator field poles 33, respectively. The polarities of each field winding are noted by the conventional Cross-Dot notation at field windings 35. The stator poles are formed such that their (effective) working width 45 (or W1 in FIG. 2) is slightly greater than the pole separation distance 46 (or W2 in FIG. 2), to complement and allow for the geometric forming and the surface and tip contouring. Pole width W1 is made to complement the pole tip contouring 12 (FIG. 1) and the surface contouring such that the effect will be a variation in the air gap reluctance, whereby the normalized reciprocal of the air gap reluctance and the composite magnetic flux in the quadrature-axis transition zone (FIG. 4) will conform substantially to a sinusoidal function. A graphical representation of the double-apex/single-apex contouring, as illustrated in FIG. 1, (where W1/W=1.1 was used), from a complex mathematical resolve involving the normalized reciprocal of the air gap reluctance (FIG. 4) which substantially characterizes a sinusoidal function, is used on each stator pole 32 and 33, and rotor pole 23. The contouring in FIG. 1 is applied by graphical reference of each contour point, in proportion to the minimum air gap magnitude G (FIG. 1), as determined by the apex to apex distance when a direct apex to apex alignment is simulated. Further contouring detail and refinement can be established by a mathematical concept involving the variation of the air gap reluctance as the poles move from the direct-axis orientation toward the quadrature-axis orientation. The unique double-apex/single-apex contouring of FIG. 1 produces a unique geometrically dynamic, variable reluctance air gap which is capable of producing an open terminal, output emf waveform which consists substantially of the fundamental component. This characteristic is essential to the viability and efficiency of the synchronous machine made subject of the preferred embodiment.

Rotor assembly 21 consists of two passive magnetic circuit elements 22 (FIG. 18), which are typically laminated, and are separated by a non-magnetic structure 21, typically a material such as an aluminum alloy or stainless steel. The construction may involve pin, dovetail, or fusion bonding of elements 22 to structure 21. Each rotor element 22 has two salient magnetic poles 23, with each rotor pole having surface and tip contouring 12 and an effective working width (W1) which complements the stator pole, in accordance with the above description.

Now to complete this illustration of an operational example of the present invention, it will be assumed that a mechanical torque is applied to the rotor shaft 20, and in addition, field windings 35 are energized with a direct current and with proper polarity, thereby making the machine operational as a field excited, synchronous generator. The rotation of the rotor embodiment produces an alternating magnetic flux in each of the armature windings 34 which changes polarity each electrical cycle. The alternating magnetic flux is further defined by the interdependent working relationships between the pole surface and tip contouring, the working pole width (W1) and the proportional geometry of the air gap, relative to the minimum air gap magnitude G (FIG. 1). The alternating magnetic flux linking the armature windings produce an open terminal, output emf waveform which consists substantially of the fundamental component as a result of the above special interdependent parameters and the unique contouring of FIG. 1. The open terminal waveform of the magnetic flux is shaped by the unique contouring above by the variable reluctance air gap, which in turn provides for a variable reluctance magnetic circuit. However, the air gap is typically made to be the controlling factor, with the reluctance of the magnetic structure typically made negligible by design, as application permits. The reluctance then is so controlled by the air gap reluctance that the arithmetically normalized reciprocal of the air gap reluctance decreases with substantially a sinusoidal form as the magnetic poles move from the direct-axis orientation to the quadrature-axis orientation. A complementary relationship between the pole width, the pole tip contouring, the pole surface contouring, and the parameters of the minimal apex to apex distance (G) provide the proper transition of the flux through the flux reversal zone, or through the quadrature-axis position. It is the objective, to providing proper transition, to avoid undesirable irregularities in the emf waveform in this zone.

I claim:

1. A set of salient magnetic poles in an electromechanical machine; said set consisting of a stator pole and an opposing rotor pole, working in a complementary relationship, with said salient magnetic poles having an interdependent working relationship between the effective working pole circumferential width and the working surface and pole tip contouring; said salient magnetic poles having complementary contouring such that one magnetic pole of said set has primarily and substantially a single-apex contouring, while the opposing magnetic pole has primarily and substantially a double-apex contouring; said salient magnetic poles in said set having substantially equivalent widths.

2. A set of salient magnetic poles in an electromechanical machine as in claim 1, wherein the complementary single-apex/double-apex contouring has an interdependent relationship with the minimum air gap magnitude; said minimum air gap magnitude being the apex to apex distance while in direct apex to apex alignment.

3. A set of salient magnetic poles in an electromechanical machine as in claim 1, wherein the complementary contouring on each pole in said set provides an interdependent working relationship between the effective working pole surfaces and tips, whereby the air gap reluctance will vary by the relative motion of the poles from a direct-axis orientation to the quadrature-axis orientation, such that the air gap reluctance increases relative to the direct-axis, air gap reluctance, in accordance with substantially the characteristic of a algebraic expression.

4. A set of salient magnetic poles in an electromechanical machine as in claim 1, wherein the complementary contouring on each pole in said set provides an interdependent working relationship between the effective working pole surfaces and pole tips; said pole tips being contoured to be interdependent with and complementary to both the pole surface contouring and the pole width, whereby the air gap reluctance will vary by the relative motion of the poles from a direct-axis orientation to the quadrature-axis orientation, such that the normalized mathematical reciprocal of the air gap reluctance decreases relative to the normalized mathematical reciprocal of the direct-axis, air gap reluctance, in accordance with a substantially sinusoidal function.

5. A set of salient magnetic poles in an electromechanical machine as in claim 1, wherein the complementary contouring provides an interdependent working relationship between the effective working pole surfaces and pole tips; said pole tips being contoured to be interdependent with and complementary to both the pole surface contouring and the pole width, whereby the air gap reluctance will vary by the relative motion of the poles from the direct-axis orientation to the quadrature-axis orientation, such that the normalized mathematical reciprocal of the air gap reluctance decreases relative to the normalized mathematical reciprocal of the direct-axis, air gap reluctance, in accordance with substantially a predetermined Fourier Series function waveform.

6. A set of salient magnetic poles in an electromechanical machine as in claim 4, whereby the ratio of the value of the direct-axis, average air gap to the working pole surface width is less than seven one-hundredths (0.07).

7. A set of salient magnetic poles in an electromechanical machine as in claim 5, whereby the ratio of the value of the direct-axis, average air gap to the working pole surface width is less than seven one-hundredths (0.07).

8. An electromechanical, windingless rotor, variable reluctance, filed excited synchronous machine, comprising the following combination:

(a) a stator means for magnetic flux paths; said stator means having stator poles, said stator poles being disposed for use as armature and field poles, said stator poles extending radially from said stator means, said stator poles having surfaces that work in cooperation with the rotor pole surfaces to effect magnetically workable air gaps, with said stator poles consisting of armature magnetic poles and field magnetic poles disposed in a rotational orientation on said stator means, such that each armature magnetic pole is intermediate to two said field magnetic poles; with a field magnetic flux source disposed with said field magnetic poles, and an armature winding disposed on each of the armature magnetic poles;

(b) a rotor means, with said rotor means being rotatably disposed with said stator means; said rotor means having rotor elements uniformly disposed on said rotor means, with said rotor elements being constructed of material that has a permeability substantially greater than that of free space, with said rotor elements being separated and supported by material whose permeability approximates that of free space, said rotor elements having an axial orientation, said rotor elements having salient magnetic poles and being magnetically passive;

wherein the improvement comprises salient stator and rotor poles having substantially equivalent circumferential widths; with said widths being complementary to, and sharing an interdependent working relationship with the pole surface and tip contouring of the stator and rotor poles, thereby providing for magnetically workable air gaps which are capable of effecting an output, open terminal, electromotive force waveform which consists predominantly of the fundamental frequency component; along with groupings of said stator poles which work in cooperation with an assembly of rotor poles, by means of relative angular rotational displacement about the axis of said machine.

9. A machine as in claim 8, in which groupings of stator poles work in cooperation with an assembly of rotor poles, by means of relative angular rotational displacement between said groupings of stator poles relative to the rotor assembly, about the axis of said machine; in conjunction with a means of rotor pole position indication, to provide for a self-commutated machine.

10. A machine as in claim 9, in which an assembly of the magnetically active armature and field magnetic poles is disposed with an assembly of the magnetically passive elements and poles, in a complementary linear format; in conjunction with a means of pole position indication, to provide for a self-commutated machine in a linear format, to provide for linear propulsion.

11. A machine as in claim 8, wherein the improvement comprises salient stator and rotor poles having interdependent widths which work in cooperation with the magnetic pole surface and tip contouring to form the magnetically workable air gap, such that a set of opposing poles, consisting of a singular stator pole and a singular rotor pole, provides for a geometrically dynamic, variable reluctance air gap by means of the interdependent working relationship between one of the magnetic poles in said set having a double-apex contouring, and the opposing magnetic pole in said set having a single-apex contouring; said geometrically dynamic, variable reluctance air gap providing for an open terminal, output electromotive force waveform consisting substantially of the fundamental component.

12. A machine as in claim 11, whereby the improvement further comprises a minimal, direct-axis, average air gap, whereby the ratio of the value of the direct-axis, average air gap to the working surface pole width is less than seven one-hundredths (0.07).

13. An electromechanical, windingless rotor, field excited, synchronous-type machine, comprising the following combination:

(a) a stator means for magnetic flux paths; said stator means having salient stator poles extending radially from said stator means; said stator poles being disposed for use as armature poles and field poles; said stator poles having contoured surfaces and tips as the working air gap surfaces that work in cooperation with he rotor pole contoured surfaces and tips to effect magnetically workable air gaps; said stator poles consisting of armature magnetic poles and field magnetic poles disposed in a rotational orientation about the axis of said stator means and said machine, such that two armature magnetic poles re intermediate to two field magnetic poles, with said two field magnetic poles being opposite in magnetic polarity, and the said two armature magnetic poles encompassed by one armature winding; said magnetic polarity of each pole in the field pole set exhibiting a uniform sequence about the stator assembly; said stator poles being uniformly disposed about the stator assembly and totaling to a quantity that is a multiple of the number four (4);

(b) a rotor means, with said rotor means being rotatably disposed with said stator means; said rotor means having uniformly spaced, salient magnetic rotor poles; said salient magnetic rotor poles totaling to a quantity that is one-half the number of said stator poles; said rotor poles and stator poles having substantially equivalent effective working pole circumferential widths;

(c) a salient stator and rotor pole interdependent and complementary effective working pole width which is capable of providing a cooperative working relationship with said contoured surfaces and tips of the magnetic poles informing the magnetically workable air gap, whereby the air gap reluctance can be varied by the relative motion between the rotor poles and the stator poles from the direct-axis orientation to the quadrature-axis orientation, such that the normalized mathematical reciprocal of the air gap reluctance decreases relative to the normalized mathematical reciprocal of the direct-axis, air gap reluctance, in accordance with a substantially linear, algebraic function of the form.

14. A machine as in claim 13, in which groupings of stator poles work in cooperation with an assembly of rotor poles, by means of relative angular rotational displacement, between said groupings of stator poles relative to the rotor assembly, about the axis of said machine, to provide for a polyphase machine.

15. A machine as in claim 13, in which groupings of stator poles work in cooperation with an assembly of rotor poles, by means of relative angular rotational displacement, between said groupings of stator poles relative to the rotor assembly, about the axis of said machine; in conjunction with a means of pole position indication, to provide for a self-commutated machine.

16. A machine as in claim 13, in which the interdependent and complementary width of the salient stator and rotor poles is capable of providing a cooperative working relationship with the pole surface and tip contouring in forming the magnetically workable air gap; said pole surface and tip contouring providing a set of opposing poles, consisting of a singular salient stator pole and a singular salient rotor pole, which provides for a geometrically dynamic, variable reluctance, air gap by means of the interdependent working relationship, and the opposing magnetic in said set having a double-apex contouring, and the opposing magnetic pole in said set having a single-apex contouring; said tip contouring being interdependent with and complementary to both the pole surface contouring and the pole width.

17. A machine as in claim 16, in which the interdependent and complementary pole width and pole surface and tip contouring will provide a geometrically dynamic, variable reluctance air gap, whereby the air gap reluctance will vary by the relative motion of the poles from a direct-axis orientation to the quadrature-axis orientation, such that the normalized mathematical reciprocal of the air gap reluctance decreases relative to the normalized mathematical reciprocal of the direct-axis, air gap reluctance, in accordance with a substantially sinusoidal function, as well as providing for an open terminal, output electromotive force waveform consisting substantially of the fundamental component.

18. A machine as in claim 17, wherein the ratio of the value of the direct-axis, average air gap to the pole width is less than seven one-hundredths (0.07).

* * * * *